United States Patent [19]

Derickson et al.

[11] Patent Number: 5,796,479
[45] Date of Patent: Aug. 18, 1998

[54] SIGNAL MONITORING APPARATUS FOR WAVELENGTH DIVISION MULTIPLEXED OPTICAL TELECOMMUNICATION NETWORKS

[75] Inventors: Dennis Derickson, Windsor; Roger Lee Jungerman, Petaluma, both of Calif.

[73] Assignee: Hewlett-Packard Company, Palo Alto, Calif.

[21] Appl. No.: 824,978

[22] Filed: Mar. 27, 1997

[51] Int. Cl.$^6$ ..................................................... G01J 3/28
[52] U.S. Cl. ............................................. 356/326; 356/328
[58] Field of Search ........................................... 356/326, 328, 356/330–334, 307, 300, 305

[56] References Cited

U.S. PATENT DOCUMENTS 5,233,405  8/1993  Wildnauer et al. ........................ 356/333

FOREIGN PATENT DOCUMENTS

WO96 28713  9/1996  WIPO.

OTHER PUBLICATIONS

"Multiwavelength Simultaneous Monitoring Circuit Employing Wavelength Crossover Properties Of Arrayed--Waveguide Grating", By M. Teshima, M. Koga and K.Sato; Electronics Letters, vol. 31, No. 18, Aug. 31, 95, pp. 1595–1597.

*Primary Examiner*—K. Hantis
*Attorney, Agent, or Firm*—John L. Imperato

[57] ABSTRACT

A detector array spectrometer simultaneously monitors wavelength, power, and signal-to-noise ratio of wavelength division multiplexed (WDM) channels in telecommunication networks. A spectrometer spatially separates signals from the WDM channels according to the channels' wavelengths. The separated signals are incident on an array of split-detectors that conforms to the spatial separation of the signals provided by the spectrometer. While the split-detectors are positioned to receive a signal from each WDM channel, a noise detector is positioned between adjacent split-detectors to measure noise. A common mode output from two halves of each split-detector indicates the power in a WDM channel, while a differential output from the halves indicates wavelength deviations in the WDM channels. The ratio of the common mode signal to the noise detector signal is used to monitor the signal-to-noise ratio of the WDM channel. An angled diffraction grating in the spectrometer achieves compact size and high measurement resolution for the detector array spectrometer.

13 Claims, 4 Drawing Sheets

SIGNAL MONITORING APPARATUS FOR WAVELENGTH DIVISION MULTIPLEXED OPTICAL TELECOMMUNICATION NETWORKS

FIELD OF THE INVENTION

The present invention relates to optical signal monitoring, and, more particularly, to a detector array spectrometer for monitoring power, wavelength and signal-to-noise ratio of wavelength division multiplexed channels in optical telecommunication networks.

BACKGROUND OF THE INVENTION

High data rates are achieved in optical telecommunication networks using wavelength division multiplexed (WDM) signals. Network standard documents, such as the Bellcore GR-2918, have been published to specify wavelength locations and spacings for WDM channels within the networks. Network performance relative to these standards can be verified by monitoring wavelength, power and signal-to-noise ratio (SNR) of the WDM channels. Simultaneous monitoring of the WDM channels is especially important in optical telecommunication networks that include erbium doped fiber amplifiers (EDFAs), as a failure in one channel may degrade the performance of other channels in the network due to gain saturation effects in the EDFA. One technique for simultaneously monitoring WDM channels uses an arrayed waveguide grating and is described in "Multiwavelength Simultaneous Monitoring Circuit Employing Wavelength Crossover Properties Of Arrayed-Waveguide Grating", by Teshima, Koga and Sato, Electronics Letters, Vol. 31, No. 18, August 1995. While this technique may provide wavelength and power monitoring of WDM channels, SNR is not readily monitored using the arrayed waveguide grating. Alternatively, spectrometers may be used to simultaneously monitor WDM channels. Spectrometers, which incorporate a high density array of detector elements, achieve adequate resolution and spectral coverage, but are inefficient in their use of the detector elements. Since most of the spectrum within the optical network's bandwidth is unused, most of detector elements are dedicated to monitoring these unused spectral segments between WDM channels, adding undue cost and complexity to this type of monitoring system.

SUMMARY OF THE INVENTION

In accordance with the preferred embodiment of the present invention, a detector array spectrometer provides efficient use of detectors to simultaneously monitor wavelength, power, and signal-to-noise ratio of WDM channels in optical telecommunication networks. The detector array spectrometer incorporates an angled diffraction grating to achieve compact size, while spatially separating component signals from each of the WDM channels according to the channels' wavelengths. The component signals provided by the diffraction grating are incident on an array of split-detectors that conforms to the spatial separation of the component signals. While the split-detectors receive a signal from each WDM channel, noise detectors positioned between adjacent split-detectors measure noise levels between WDM channels. Each of two halves of each split-detector is equally illuminated by the component signal when the WDM channel is operating at its designated channel wavelength. Output signals from the two halves are summed to monitor the power of the WDM channel, while the difference between the output signals from the two halves indicates deviation from the designated WDM channel wavelength. The ratio of the power in the WDM channel to the noise level measured by the adjacently positioned noise detector monitors the SNR of the WDM channel.

DETAILED DESCRIPTION OF THE PREFERRED EMBODIMENT

Figure 1:
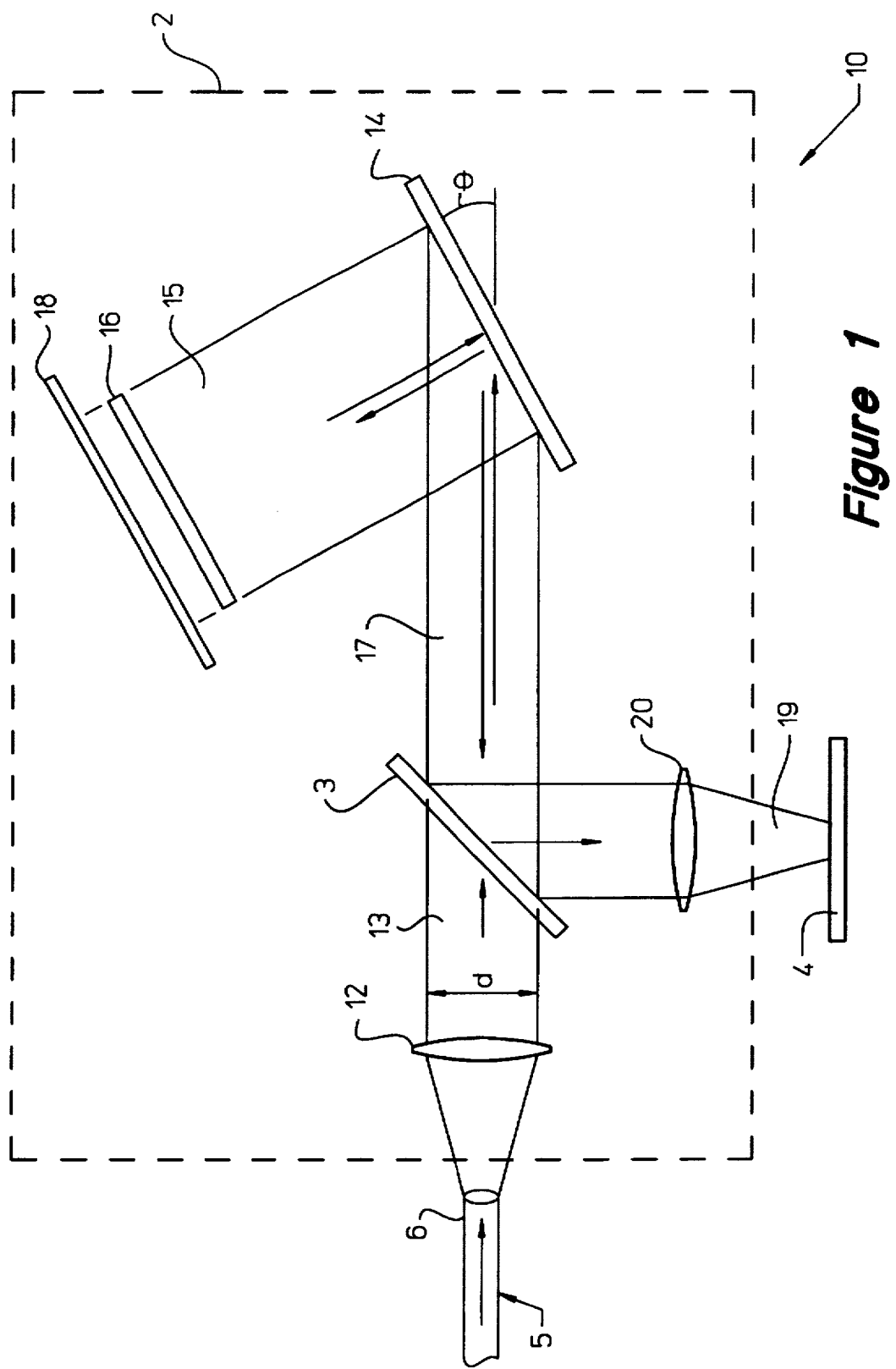
FIG. 1 shows a signal monitoring apparatus constructed according to the preferred embodiment of the present invention.

FIG. 1 shows a signal monitoring apparatus 10 constructed according to the preferred embodiment of the present invention. The signal monitoring apparatus 10 includes a spectrometer 2 and a detector array 4. A telecommunication network or other source supplies a wavelength division multiplexed (WDM) input signal 5 to the spectrometer 2 on an input fiber 6. An input lens 12 positioned at the end of the input fiber 6 collimates light emerging from the input fiber 6 into an incident beam 13. When the input lens 12 has a short focal length and is positioned close to the end of the input fiber 6, this incident beam 13 has a small diameter d and a small cross-sectional area relative to the surface area of a diffraction grating 14. To compensate for this small beam diameter d, the grating 14 is positioned at an angle θ relative to the incident beam to enable an area of the grating 14 which is larger than the incident beam 13's cross-sectional area to be illuminated. As the illumination area of the grating 14 increases, diffraction of the incident beam 13 by the grating 14 correspondingly increases. The increased diffraction, in turn, increases the wavelength resolution of the spectrometer 2. The angle θ is sufficiently small to achieve adequate wavelength resolution for the signal monitoring apparatus 10 while maintaining sufficient diffraction efficiency.

The grating 14 diffracts the incident beam 13, spatially separating the component wavelengths of the input signal 5. A diffracted beam 15 emerging from the grating 14 is incident on a waveplate 16 and mirror 18 which cause a polarization rotation of 90 degrees. Once reflected off the mirror 18, the diffracted signal 15 is again incident on the grating 14. The second pass on the grating by this polarization rotated signal significantly reduces the dependence of the grating 14's insertion loss on the polarization of the input signal 5. The use of waveplates 16 to reduce polarization sensitivity of a diffraction grating is disclosed in U.S. Pat. No. 5,233,405. The incident beam 13 and the diffracted beam 15 as reflected back to the grating 14, form a double-passed diffracted beam 17 that is directed by splitter 3 and is then focused by an output lens 20 to provide a diffracted signal 19. The diffracted signal 19 is projected onto the detector array 4.

Figure 2:
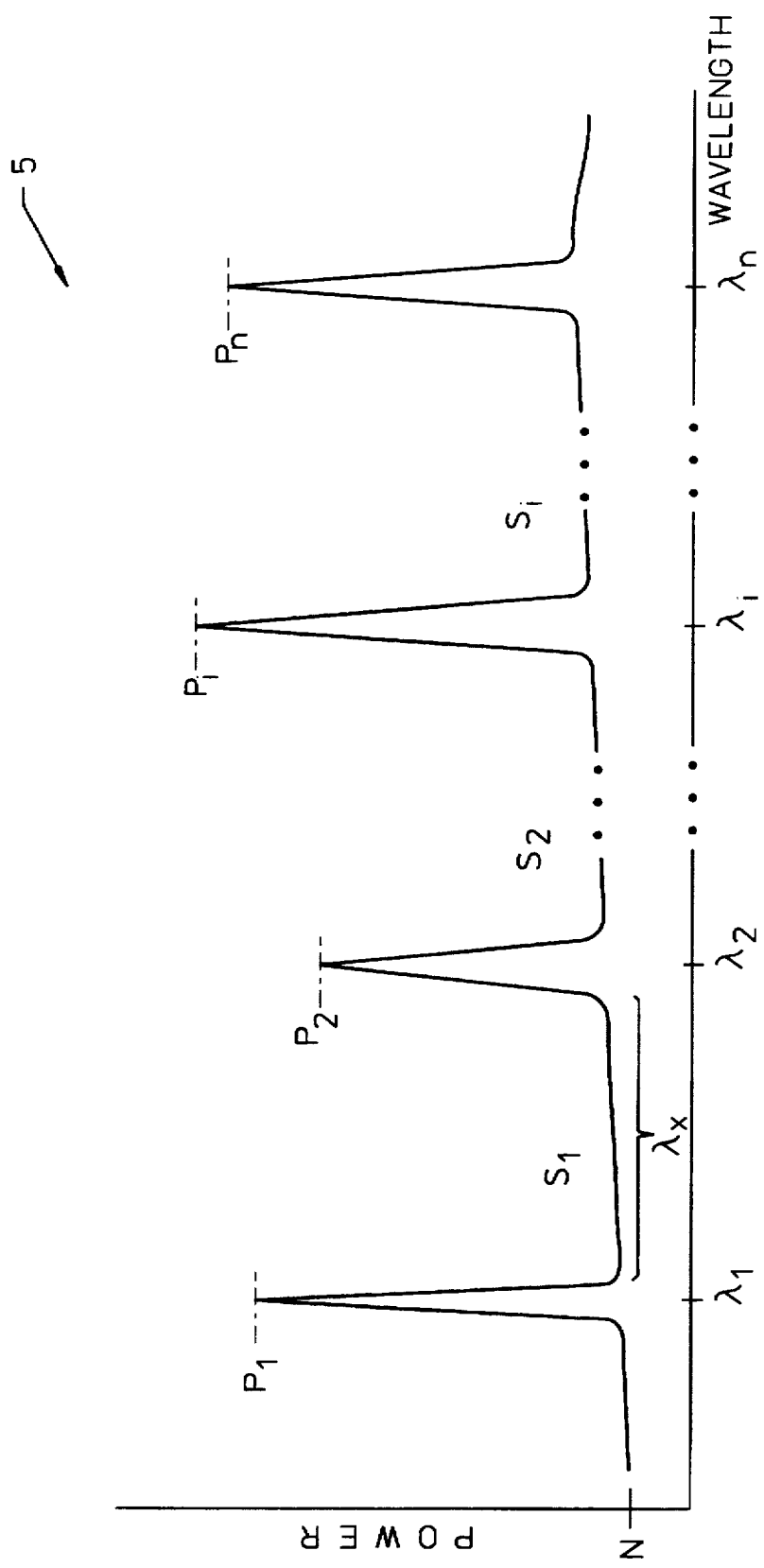
FIG. 2 shows a wavelength division multiplexed signal applied to the signal monitoring apparatus of FIG. 1.

FIG. 2 shows the wavelength spectrum of a typical WDM input signal 5 applied to the spectrometer 2. The WDM input signal 5, in this example, includes all of the signals from the WDM channels in a telecommunication network applied to the spectrometer 2 simultaneously. Each WDM channel has a predefined channel wavelength $\lambda 1 \ldots \lambda n$ and channel power $P1 \ldots Pn$. The channel wavelengths are typically equispaced by a predetermined channel spacing $\lambda x$. The spectral segments $S1 \ldots Sn$ located between channel wavelengths $\lambda 1 \ldots \lambda n$ provide an indication of the channel's noise level N.

Figure 3A:
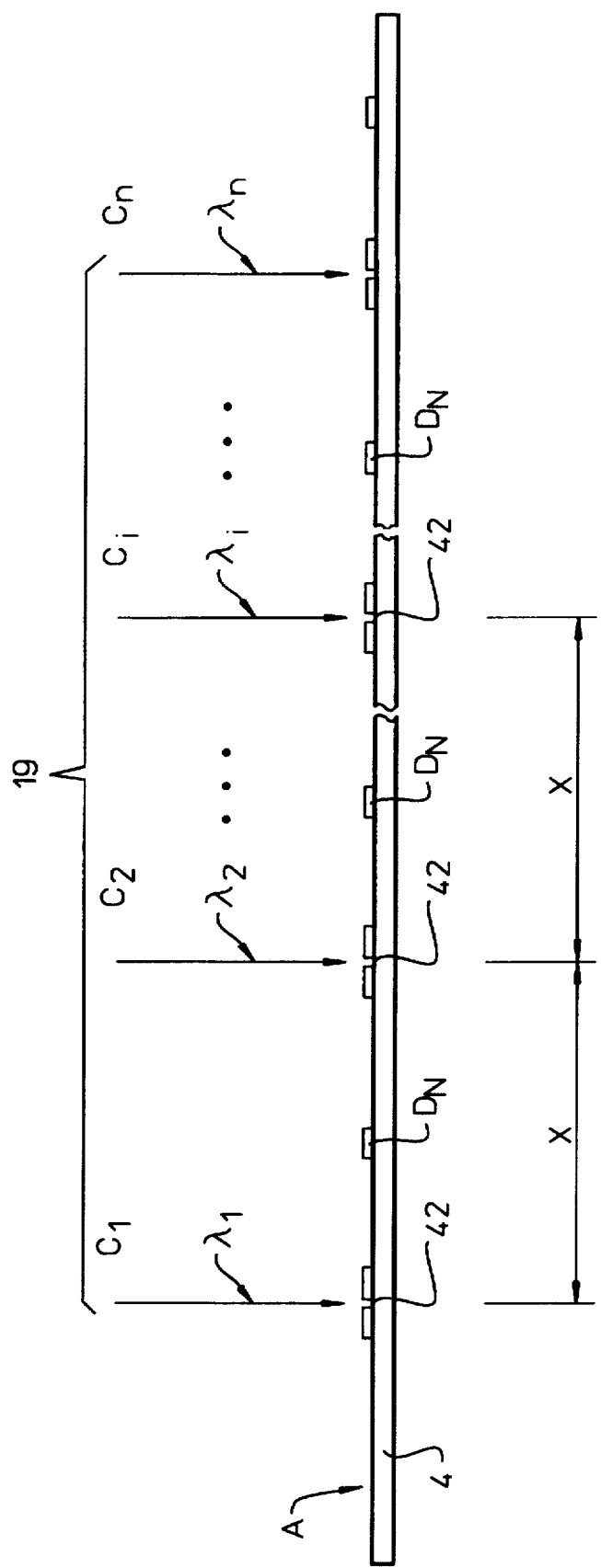
FIGS. 3A and 3B show detailed views of a detector array within the signal monitoring apparatus of FIG. 1.

FIG. 3A shows the diffracted signal 19 supplied by the spectrometer 2 illuminating the detector array 4. The spectrometer 2 spatially separates the WDM input signal 5 into component signals C1 . . . Cn according to the channel wavelengths λ1 . . . λn. At the array 4, the component signals C1 . . . Cn are separated by a distance x that is proportional to the corresponding channel wavelength spacing λx. Split-detectors 42 are positioned within the array 4, and separated by the distance x to receive the component signals C1 . . . Cn of the diffracted signal 19 corresponding to each WDM channel's wavelength λ1 . . . λn. Noise detectors $D_N$ are positioned in the array 4 at locations offset from the split-detectors 42 to measure noise levels in the spectral segments S1 . . . Sn between channel wavelengths λ1 . . . λn.

Figure 3B:
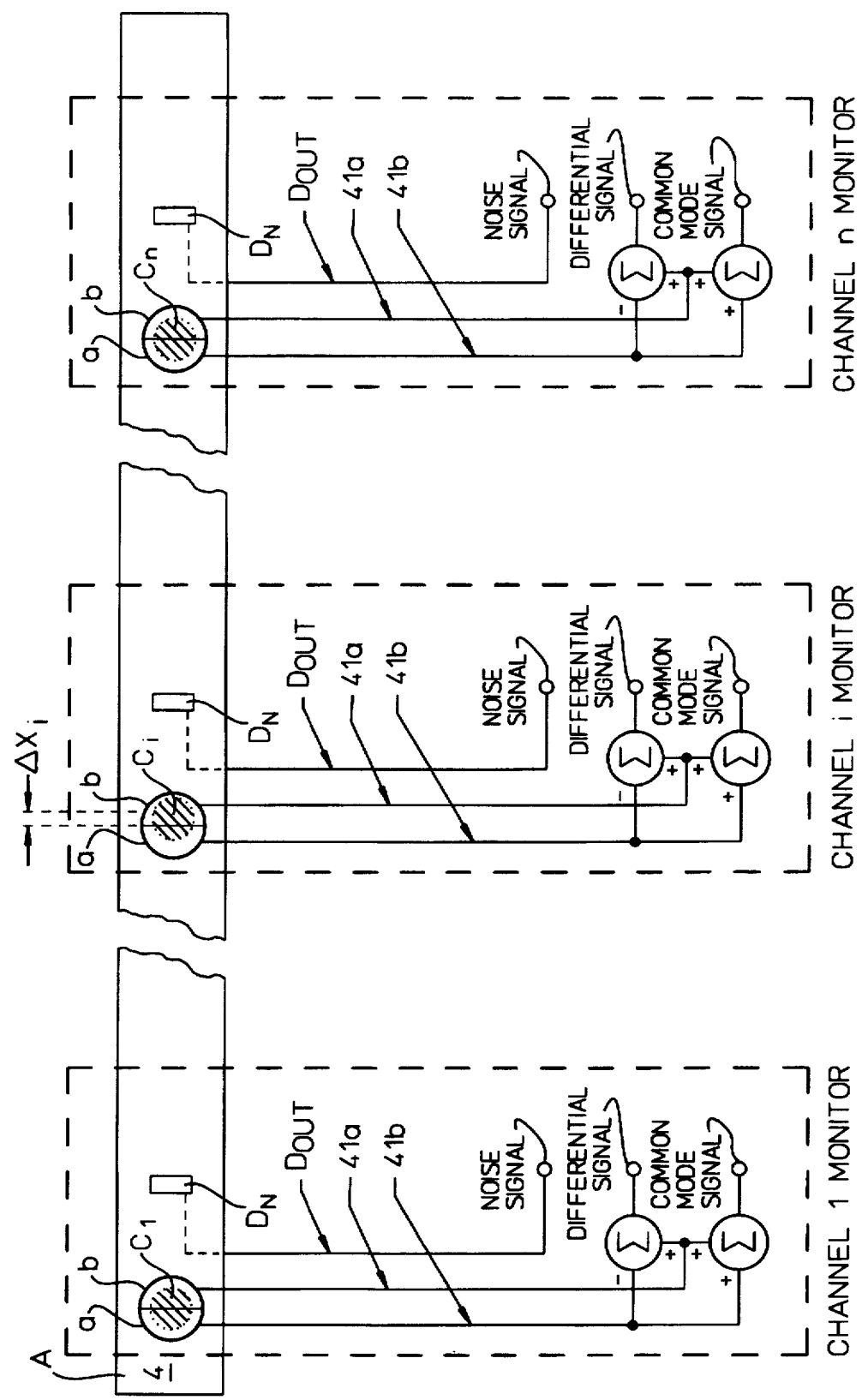

FIG. 3B shows surface A of the detector array 4 that is illuminated by the diffracted signal 19. Together, the split-detectors 42 and noise detectors $D_N$ monitor wavelength, power and signal-to-noise ratio (SNR) of each WDM channel in the applied input signal 5. Each component signal C1 . . . Cn at its corresponding channel wavelength λ1 . . . λn illuminates a corresponding split-detector 42 in the detector array 4. Each split-detector 42 has two isolated halves a, b. When a WDM channel is operating at its specified, or center, channel wavelength, both halves a, b are equally illuminated. Since the halves a, b of each split-detector 42 are fabricated to have equal sensitivity, the detector output signals 41a, 41b from each half a, b are equal when the halves a, b are equally illuminated. As a WDM channel wavelength λi (where $1 \leq i \leq n$) deviates from its center wavelength, the position of the component signal Ci (where $1 \leq i \leq n$) shifts relative to the split-detectors 42 due to the action of the grating 14. This shift causes unequal illumination of the halves a, b. Because the spectrometer 2 spatially separates the WDM input signal 5 into component signals 29 according to the component signal wavelength, when the wavelength of a WDM channel deviates from its center wavelength by an amount Δλi, this wavelength offset Δλi is manifested as a spatial shift Δxi of the component signal Ci at the array 4. Spatial shift Δxi is zero when the WDM channel component signal Ci is at its center wavelength λi. The spatial shift Δxi and the resulting unequal illumination of the halves a, b, causes a difference in the detector output signals 41a, 41b from each half a, b of the split-detector 42. The differential signal, or difference signal, between detector output signals 41a, 41b indicates the wavelength deviation Δλi from the WDM channel's center wavelength λi. When the wavelength deviation Δλi is large enough, none of the component signal Ci is intercepted by the split-detector 42. This condition is indicated by the levels of the detector output signals 41a, 41b.

Power of each WDM channel is also monitored via the component signals C1 . . . Cn of the diffracted signal 19. Power is indicated by the common mode signal, or sum, of the detector output signals 41a, 41b, from the halves a, b of the split-detectors 42 indicates power in component signal C1 . . . Cn and the corresponding WDM channel. The noise detectors $D_N$, interposed in the array 4 between the split-detectors 42, detects the noise level in the optical spectral segments S1 . . . Sn between the component signals C1 . . . Cn. The ratio of the common mode signal used to monitor channel power detector to the output signal $D_{OUT}$ from the noise detector $D_N$, indicates the signal-to-noise ratio (SNR) of the WDM channels and provides the means to monitor the SNR. Together, the noise signal, differential signal and common mode signals are used to monitor the wavelength deviations, power and SNR of the WDM channels. The signal monitoring apparatus 10 may be fabricated without noise detectors $D_N$ in applications of the signal monitoring apparatus to power and wavelength monitoring.

Minor errors in positioning the split-detectors 42, or mismatches in sensitivity of the detector halves a, b are calibrated in the signal monitoring apparatus 10 by providing an input signal 5 at the WDM channel wavelengths as a reference to zero the differential signal. Signals of known optical power at each of the WDM channels can be used as a reference to calibrate the common mode signal.

While a spectrometer 2 is used to spatially separate the component signals C1 . . . Cn of the input signal 5 according to the component signals' wavelengths, prisms or other known means may be used to spatially separate the component signals. Optical telecommunication networks in which the WDM channels are not uniformly spaced according to channels' wavelengths λ1 . . . λn are also accommodated by the signal monitoring apparatus 10. For example, when the WDM channels in the telecommunication network are uniformly separated in frequency, the wavelength separation and the corresponding spatial separation between successive WDM channels is nonuniform. The split-detectors 42 in the detector array 4 are then positioned nonuniformly, to correspond to the spatial separation of the component signals C1 . . . Cn and to receive the component signals.

What is claimed is:

1. A signal monitoring apparatus, comprising:

a spectrometer for receiving an applied optical signal having a plurality of component signals at predefined wavelengths, the spectrometer spatially separating the component signals according to the predefined wavelengths; and a detector array having a plurality of spatially separated split-detectors, each positioned to receive a corresponding one of the spatially separated component signals and each split-detector having two halves, each half providing an output signal in response to illumination by the received component signal whereby the difference between the output signals of each half indicates deviation from the predefined wavelength of the received component signal and the sum of the output signals from each half indicates power in the received component signal; and a plurality of noise detectors, each noise detector of the plurality interspaced between the split-detectors for receiving optical noise signals in spectral segments between the predefined wavelengths, each noise detector producing a noise signal output in response to the optical noise signal.

2. The signal monitoring apparatus of claim 1 wherein the split-detectors and the noise detectors form a linear detector array.

3. The signal monitoring apparatus of claim 2 wherein the split-detectors are equally spaced and the noise detectors are equidistant from the consecutive split-detectors in the linear detector array.

4. The signal monitoring apparatus of claim 3 wherein each component signal of the optical signal corresponds to a wavelength division multiplexed channel of a telecommunication network and the ratio of the sum of the output signals from the halves of the split-detectors to the noise signal output from the noise detector adjacent to the split-detector in the linear detector array indicates the signal-to-noise ratio of the corresponding wavelength division multiplexed channel.

5. The signal monitoring apparatus of claim 1 whereby the two halves are equally illuminated by the received component signal when the wavelength of the received component signal is equal to the predefined wavelength.

6. The signal monitoring apparatus of claim 5 whereby the two halves are unequally illuminated by the received component signal when the wavelength of the component signal deviates from the predefined wavelength.

7. The signal monitoring apparatus of claim 6 wherein each component signal of the optical signal corresponds to a wavelength division multiplexed channel of a telecommunication network.

8. A signal monitoring apparatus, comprising:

an input lens for receiving an optical signal having a plurality of component signals each at a predefined wavelength, the input lens producing a collimated signal having a beam area;

a diffraction grating angled relative to the collimated signal to provide an illumination area on the diffraction grating greater than the beam area, the diffraction grating providing a first diffracted signal;

a mirror receiving the first diffracted signal and providing a reflected signal back to the grating;

a waveplate interposed between the diffraction grating and the mirror providing a 90 degree polarization rotation between the first diffracted signal and the reflected signal, whereby the diffraction grating produces a second diffracted signal from the reflected signal independent of the polarization of the received optical signal, the second diffracted signal including the component signals spatially separated according to the component signals' predefined wavelengths;

an optical splitter receiving and redirecting the second diffracted signal;

an output lens receiving the second diffracted signal from the splitter and focusing the second diffracted signal; and a detector array receiving the second diffracted signal from the output lens, the detector array including a plurality of split-detectors each positioned to receive the spatially separated component signal at a corresponding one of the predefined wavelengths, each split-detector having two halves equally illuminated by the received component signal when the component signal is at the predefined wavelength, each half of the split-detector providing an output signal in response to the illumination whereby the difference of the output signals of each half indicates deviation from the predetermined wavelength of the corresponding component signal and the sum of the output signals from each half indicates power in the corresponding component signal; and a plurality of noise detectors, each noise detector of the plurality interspaced between the split-detectors for receiving optical noise signals in spectral segments between the predefined wavelengths, each noise detector producing a noise signal output in response to the optical noise signal.

9. The signal monitoring apparatus of claim 8 wherein the split-detectors and the noise detectors form a linear detector array.

10. The signal monitoring apparatus of claim 9 wherein the split-detectors are equally spaced and the noise detectors are equidistant from the consecutive split-detectors in the linear detector array.

11. The signal monitoring apparatus of claim 10 wherein each component signal of the optical signal corresponds to a wavelength division multiplexed channel of a telecommunication network and the ratio of the sum of the output signals from the halves of the split-detectors to the noise signal output from the noise detector adjacent to the split-detector in the linear detector array indicates the signal-to-noise ratio of the corresponding wavelength division multiplexed channel.

12. The signal monitoring apparatus of claim 8 whereby the two halves are unequally illuminated by the received component signal when the wavelength of the component signal deviates from the predefined wavelength.

13. The signal monitoring apparatus of claim 12 wherein each component signal of the optical signal corresponds to a wavelength division multiplexed channel of a telecommunication network.

\* \* \* \* \*